Sept. 7, 1926.
V. J. KUBIN ET AL
1,599,094
ROTARY DISK BIT
Filed July 7, 1925
Fig. 1.
Fig. 3.
Fig. 2.
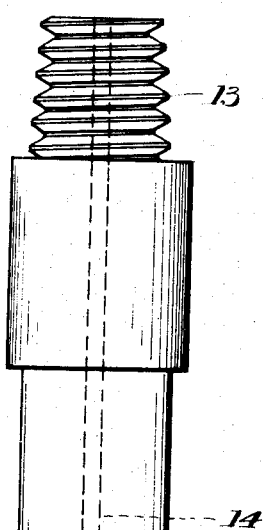
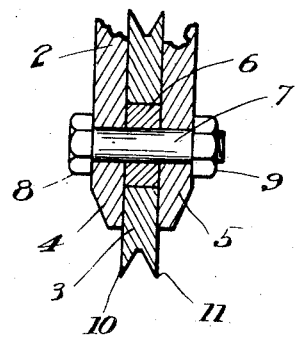
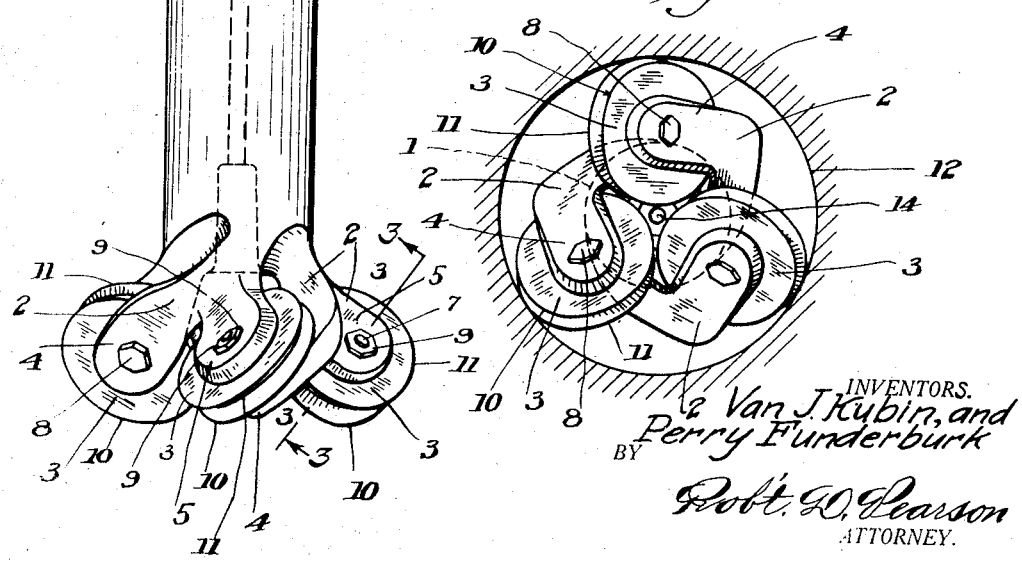
INVENTORS.
Van J. Kubin, and
Perry Funderburk
BY
Robt. D. Pearson
ATTORNEY.

Patented Sept. 7, 1926.

1,599,094

UNITED STATES PATENT OFFICE.

VAN J. KUBIN AND PERRY FUNDERBURK, OF TORRANCE, CALIFORNIA.

ROTARY DISK BIT.

Application filed July 7, 1925. Serial No. 42,042.

This invention is a rotary drill bit, particularly useful for drilling oil wells, and the general object thereof is to provide a drill bit with high cutting efficiency.

A more particular object is to provide a drill bit of the character stated with three or more cutters spaced so as to effectively center the bit at all times.

A further object is to provide a rotary drill bit with double-edge cutters, arranged so that one edge will cut the bottom and the other edge will cut the side of the well in drilling.

Other objects and advantages will appear hereinafter.

The invention is illustrated in the annexed drawing in which,—

Figure 1 is a side elevation of our bit.
Figure 2 is a bottom plan view thereof.
Figure 3 is a cross section through one of the cutters and its journal and bearing, taken on line 3—3 of Figure 1.

Corresponding reference characters designate corresponding parts in all the figures.

Our bit comprises a stem 1, a plurality of forked arms 2, preferably three in number formed on the lower end of said stem, and a corresponding number of disk cutters 3 journaled respectively between the members 4 and 5 of said forked arms on bushings 6 which are fitted on bolts 7 extending through the members of said arms respectively, the heads 8 of said bolts engaging the side members 4 and the other side members 5 being engaged by nuts 9 screw seated on the threaded ends of said bolts, whereby the bushings are clamped between said members. Said bushings are slightly longer than the width of said cutters 3 so that the cutters will turn freely between the arm members 4 and 5 while the bushings are clamped therebetween.

Each cutter 3 is peripherally grooved to provide a pair of spaced peripheral cutting edges 10 and 11. The cutter arms 2 are spaced equidistant apart so that the cutters 3, in engaging the bore 12 of the well, will always center the bit in the well. The forked arms 2 are each set at such angles with relation to the axis of the bit that in drilling, the cutting edges 10 of the cutters will cut only the bottom of the well bore, while the cutting edges 11 of the cutters will cut only the side of the bore, thus relieving each cutting edge of undue work and increasing efficiency of the cutters and the bit in general.

The stem 1 is formed with the usual threaded pin 13 on the upper end for engaging the box on the lower end of the drill stem and coupling the bit to said stem, and the stem 1 is also provided with an axial bore 14 which communicates with the bore of the drill stem for feeding water to the cutters 3 to facilitate the drilling operation of the bit.

We claim—

1. A drill bit including a stem, a plurality of arms formed on the lower end of said stem, disk cutters journaled in said arms, said cutters each being annularly grooved at its periphery and thereby formed with a pair of spaced cutting edges, said arms being set at angles to the axis of said stem so that one cutting edge of the cutters will cut the bottom of the well bore and the other cutting edge will cut the side of the bore.

2. A drill bit including a stem, three or more arms formed on the lower end of said stem and spaced equidistant apart, three or more disk cutters journaled respectively in said arms, said cutters each being annularly grooved at its periphery and thereby formed with a pair of spaced cutting edges, said arms being set at angles to the axis of the stem so that one cutting edge of the cutters will cut the bottom and the other cutting edge will cut the side of the well bore.

3. A drill bit including a stem, a plurality of arms formed on the lower end of said stem, disk cutters journaled in said arms, said cutters each being annularly grooved at its periphery and thereby formed with a pair of spaced cutting edges, said arms being set at angles to the axis of said stem so that one cutting edge of the cutters will cut the bottom of the well bore and the other cutting edge will cut the side of the bore, said cutters being of such diameter and arranged in such manner as to cut a coreless bore.

In testimony whereof we hereunto affix our signatures.

VAN J. KUBIN.
PERRY FUNDERBURK.